United States Patent Office 3,481,385
Patented Dec. 2, 1969

3,481,385
PNEUMATIC VEHICLE TIRE
Lothar Depmeyer, Garbsen, and Hermann Wittneben, Hannover, Germany, assignors to Continental Gummi-Werke A.G., Hannover, Germany
Filed June 15, 1967, Ser. No. 646,284
Claims priority, application Germany, June 18, 1966,
C 39,394
Int. Cl. B60c 9/02
U.S. Cl. 152—360      1 Claim

ABSTRACT OF THE DISCLOSURE

The present invention relates to a pneumatic vehicle tire with overlapping reinforcing inserts in which the overlapping closely superimposed ends of said reinforcements are held together by rubber therebetween, the overlapping areas having a width considerably less than the width of the tread strip. The pneumatic vehicle tire according to the invention is characterized primarily in that the overlapping areas are reinforced by a rubber strip located adjacent the respective adjacent overlay and having a hardness which is greater than the hardness of the rubber between the respective superimposed overlapping ends of said reinforcements.

---

The present invention relates to a pneumatic vehicle tire with overlapping parallel pull resistant threads, cables, wires, or the like forming the reinforcing inserts, the adjacent overlapping ends of the reinforcing inserts being held together by rubber therebetween, and the width of the overlapping areas being considerably less than the width of the tread strip.

With pneumatic vehicle tires it is known to interrupt the reinforcing inserts thereof and to hold the tire body together by an overlapping of the threads, cords, or the like, forming the tire reinforcement. Experience has shown that under normal conditions of operation an overlapping area with a width of approximately 30 millimeters will suffice for the transfer of forces which correspond to the extent to which the threads or cables, or the like forming said overlapping area can be subjected to a load. The strength of the connecting area is assured by the rubber between the overlapping ends. The threads, cables, wires or the like are connected to each other by a firmly adherent vulcanized-on rubber layer which is relatively thin.

It is an object of the present invention with a pneumatic vehicle tire of the above mentioned general type to improve the dynamic loadability within the range of the overlapping reinforcing inserts.

It is another object of this invention to provide a pneumatic vehicle tire as set forth in the preceding paragraph, which can easily and reliably be manufactured.

These and other objects and advantages of the invention will appear more clearly from the following specification in connection with the accompanying drawing, diagrammatically showing in section a preferred embodiment of a portion of a tire according to the invention.

Figure 1:
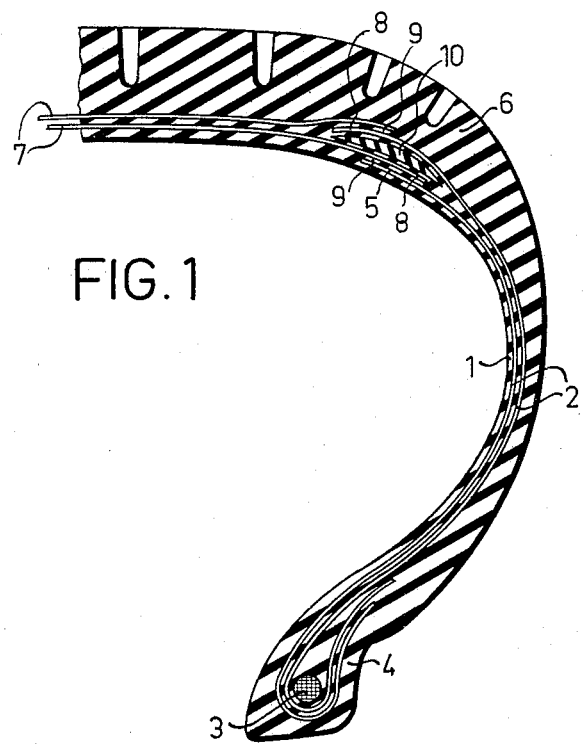
FIGURE 1 is a cross-sectional view of a tire embodying the reinforcing means of this invention.
Figure 2:
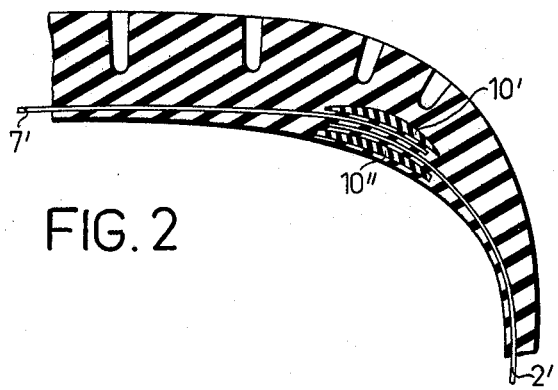
FIGURE 2 is a cross-sectional view of a tire embodying an alternate means of reinforcement of this invention.

A pneumatic vehicle tire with overlapping reinforcing inserts, the adjacent overlapping ends of which are held together by rubber therebetween while the width of the overlapping area is considerably less than the width of the tread strip is, in conformity with the present invention, characterized in that the overlapping area is reinforced by a rubber strip which engages one of the overlapping ends from the outside and has a hardness exceeding that of the rubber layer between the two overlapping ends.

In this way a stiffening against distortion is obtained, and this stiffening results in a considerable decrease in the shearing stresses at the overlapping areas. The desired reduction in the shearing stresses in the rubber or the adhering surfaces between the overlapping ends is obtained on one hand by the greater shore hardness of the rubber strip and on the other hand by a displacement of the neutral bending zone in view of the influence upon the bending area by a further body taking part in this stress.

The overlapping areas according to the invention are intended for the carcass and/or the pull resistant belt in the tread strip zone, in other words for such reinforcements of the pneumatic tire which are under the influence of the tire inner pressure and which additionally are subjected to a dynamic stress by the deformations of the tire body as they occur during the operation of the tire. Therefore, it is possible to provide the overlapping area according to the invention, for instance, for purposes of connecting two half carcasses. Preferably, however, the invention is intended to be used for such pneumatic tires according to which the half carcasses which extend through the tire side walls are in a pull resistant manner connected to the marginal areas of the tire belt by means of a short overlapping area. These overlapping areas within the range of the tire shoulders will, in combination with the additional rubber insert provided in conformity with the present invention, bring about the advantage that not only a favorable influence of the dynamic strength of the tire reinforcement is obtained, but additionally also a desired stiffening at the belt edges within the area of the critical tire shoulders.

If two overlapping areas of the tire reinforcement are arranged adjacent to each other it is advantageous in conformity with the present invention to arrange the harder rubber strip between the two overlapping areas in order in this way to be able by means of a rubber strip to influence two overlapping areas. In this connection it is to be understood that such a width of the here provided rubber strip is selected that said rubber strip will cover both overlapping areas with regard to the width thereof.

Referring now to the drawing in detail, the tire body consisting primarily of rubber material has its side walls 1 reinforced by two layers 2. The lower marginal portions of said layers 2 are looped around the bead cores 3 in the tire beads 4 and are anchored in this way. The upper ends 5 of said layers 2 end in the range of the tire shoulders 6. Here they overlap the marginal areas of belt layers 7 over a width which corresponds approximately to 15% of the tread strip width. Between the ends 5 and the marginal portions 8 of the belt layers 7 there is provided a thin rubber layer to which the layers are vulcanized. The forces conveyed from the layers 2 to the belt layers 7, and the forces conveyed in the opposite direction will thus exclusively be transmitted through the rubber layer 9 between the marginal areas 8 and the ends 5. The two overlapping areas are offset with regard to each other approximately in such a way that when viewed in transverse direction of the tire, one overlapping area starts where the other overlapping area ends.

For purposes of increasing the dynamic strength of the two overlapping areas, between both overlapping areas there is provided a vulcanized-in firmly adherent rubber strip 10 of a lens-shaped cross section which thus tapers toward both marginal areas. The width of the rubber strip 10 is so selected that said strip protrudes beyond both overlaping areas slightly at both sides by a few millimeters. The rubber strip 10 has a Shore hardness of approximately 70 to 80 Shores in contrast to a Shore hardness of the rubberization of the layers 2 or belt layers 7, which last mentioned Shore hardness is approximately from 55 to 60 Shores. The intermediate rubber layer 9 has approximately the same hardness of from 55 to 60 Shores.

The rubber layer 10 which with arched overlapping areas may also be crescent-shaped and the hardness of which is obtainable by an increased sulphur content or by suitable additions, also brings about a stiffening of the marginal portions of the tread strip or of the tire shoulders 6 and leads to a reduction in the harmful shearing stresses in the intermediate rubber layers 9.

The threads, cables, or the like which form the layers 2 extend at a right or practically right angle with regard to the circumferential direction of the tire, whereas the threads or cables of the belt layers 7, which threads or cables are parallel to each other define angles of from 5 to 30 degrees with the circumferential direction of the tire so that the threads, cables, or the like of one layer cross those of the other layer preferably symmetrically with regard to the tire circumferential direction.

If only one overlapping area is provided, a rubber strip 10 of a corresponding width is selected and it is sufficient when also in this instance the rubber strip practically overlaps the overlapping area only, in other words of a width which is by a few millimeters greater than the width of the overlapping area.

While generally one reinforcing rubber strip 10 will suffice, in special circumstances a second rubber strip may be employed which together with the other rubber strip encloses therebetween the overlapping area.

It is, of course, to be understood that the present invention is, by no means, limited to the particular construction shown in the drawing.

What we claim is:

1. A pneumatic vehicle tire with bead cores, with a tread strip, and with shoulders, which includes: a belt arranged within the tread strip zone and having layer means with the marginal areas thereof respectively located in said shoulders, reinforcing layer means respectively located in the side walls of said tire and respectively having their one end portions looped around said bead cores and having their other end portions respectively arranged in the areas of said shoulders and in overlapping relationship with regard to said marginal areas of said belt layer means, said overlapping areas being rubberized and vulcanized together, and rubber strip means respectively arranged in the areas of said shoulders and located adjacent said overlapping areas while having a hardness greater than the hardness of the rubber between said overlapping areas.

References Cited

UNITED STATES PATENTS

| | | | |
|---|---|---|---|
| 1,384,262 | 7/1921 | Landon | 152—361 |
| 1,530,574 | 3/1925 | Paull | 152—360 |
| 3,081,811 | 3/1963 | Beckadolph et al. | 152—361 |
| 3,172,445 | 3/1965 | Bousso et al. | 152—354 |

ARTHUR L. LA POINT, Primary Examiner

CHARLES B. LYON, Assistant Examiner

U.S. Cl. X.R.

152—361